United States Patent
Du et al.

(10) Patent No.: US 12,325,005 B1
(45) Date of Patent: Jun. 10, 2025

(54) ABSORPTION MEDIUM AND METHOD FOR REMOVING CARBON DIOXIDE FROM COMBUSTION EXHAUST GAS

(71) Applicant: EOG Resources, Inc., Houston, TX (US)

(72) Inventors: Yang Du, Grapevine, TX (US); Janette Cortez, Fort Worth, TX (US); Jeremiah James Thomas, Weatherford, TX (US)

(73) Assignee: EOG Resources, Inc., Houston, TX (US)

( * ) Notice: Subject to any disclaimer, the term of this patent is extended or adjusted under 35 U.S.C. 154(b) by 0 days.

(21) Appl. No.: 18/883,206

(22) Filed: Sep. 12, 2024

Related U.S. Application Data

(63) Continuation of application No. 18/673,516, filed on May 24, 2024.

(51) Int. Cl.
*B01D 53/14* (2006.01)
*B01D 53/40* (2006.01)

(52) U.S. Cl.
CPC ..... *B01D 53/1493* (2013.01); *B01D 53/1456* (2013.01); *B01D 53/1475* (2013.01); *B01D 53/40* (2013.01); *B01D 2252/20442* (2013.01); *B01D 2252/20447* (2013.01); *B01D 2257/504* (2013.01)

(58) Field of Classification Search
None
See application file for complete search history.

(56) References Cited

U.S. PATENT DOCUMENTS

| | | | |
|---|---|---|---|
| 4,112,051 A | 9/1978 | Sartori et al. | |
| 4,112,052 A | 9/1978 | Sartori et al. | |
| 4,336,233 A | 6/1982 | Appl et al. | |
| 5,618,506 A | 4/1997 | Suzuki et al. | |
| 5,736,115 A | 4/1998 | Iijima et al. | |
| 6,337,059 B1 | 1/2002 | Schubert et al. | |
| 6,500,397 B1 | 12/2002 | Yoshida et al. | |
| 7,374,734 B2 | 5/2008 | Grossman et al. | |
| 7,666,813 B2 | 2/2010 | Hoefer et al. | |
| 7,740,691 B2 | 6/2010 | Cash et al. | |
| 8,075,673 B2 | 12/2011 | Anders et al. | |
| 8,771,403 B2 | 7/2014 | Chang et al. | |
| 8,816,078 B2 | 8/2014 | Rochelle et al. | |
| 9,937,462 B2 | 4/2018 | Laroche et al. | |
| 10,857,502 B2 | 12/2020 | Tanaka et al. | |
| 2011/0171093 A1 | 7/2011 | Rochelle et al. | |
| 2014/0234192 A1* | 8/2014 | Hirata | B01D 53/1493 252/190 |
| 2015/0321138 A1* | 11/2015 | Grandjean | B01D 53/1493 423/229 |
| 2016/0214057 A1* | 7/2016 | Mathias | B01D 53/1493 |
| 2017/0021305 A1 | 1/2017 | Laroche et al. | |

OTHER PUBLICATIONS

Brent Sherman et al., "Carbon Capture with 4 m Piperazine/4 m 2-Methylpiperazine", SciVerse ScienceDirect, Energy Procedia 37 (2013) 436-447.

Ye Yuan et al., "CO2 absorption rate and capacity of semi-aqueous piperazine for CO2 capture", International Journal of Greenhouse Gas Control 85 (2019) 182-186.

Yang Du et al., "Thermal degradation of novel piperazine-based amine blends for CO2capture", International Journal of Greenhouse Gas Control 49 (2016) 239-249.

Ye Yuan et al., "Effects of viscosity on CO2 absorption in aqueous piperazine/2-methylpiperazine", Energy Procedia 114 ( 2017 ) 2103-2120.

Ricardo R. Wanderley et al., "CO2 solubility and mass transfer in water-lean solvents", Chemical Engineering Science 202 (2019) 403-416.

* cited by examiner

*Primary Examiner* — Jason M Greene
(74) *Attorney, Agent, or Firm* — Patterson + Sheridan, LLP

(57) ABSTRACT

In some embodiments, an aqueous composition for removing acid gas components from a process gas includes a first cyclic amine having a substituted carbon atom alpha to an amine atom, and a second cyclic amine having two unsubstituted carbon atoms, wherein each of the unsubstituted carbon atoms is alpha to an amine atom. The composition further includes a molar ratio of the first cyclic amine to the second cyclic amine of about 6:1 to about 2:1.

20 Claims, No Drawings

ABSORPTION MEDIUM AND METHOD FOR REMOVING CARBON DIOXIDE FROM COMBUSTION EXHAUST GAS

CROSS-REFERENCE TO RELATED APPLICATIONS

This application is a continuation application of U.S. patent application Ser. No. 18/673,516, filed May 24, 2024, which is hereby incorporated herein by reference.

FIELD

The present disclosure relates to absorption media for removal of acid gas components from combustion gases and methods thereof.

BACKGROUND

Given the rise in national and global initiatives aimed at curving current trends in industrial output emissions, many industrial entities are taking measures to reduce their carbon footprint. However, such measures should be economically viable and/or provide benefit to such industries and industrial applications.

One such example of a measure being taken includes $CO_2$ sequestration and/or removal from various process gases via absorption/regeneration processes using amine-based solutions. In a conventional $CO_2$ removal process, absorption is used to remove $CO_2$ from a combustion gas by absorbing the $CO_2$ into a capture solution. Regeneration (otherwise referred to as "stripping") is subsequently conducted to regenerate the $CO_2$ capture solution and otherwise store the $CO_2$ desorbed from the capture solution upon regeneration. Once $CO_2$ is removed from combustion gases and other gases, it can be captured and compressed for use in a number of applications, including sequestration, production of methanol, and tertiary oil recovery.

Conventional $CO_2$ removal processes utilizing amine-based capture solutions may include one or more of monoethanolamine, ethanolamine, diethanolamine, methyldiethanolamine, diglycolamine, diisopropanolamine, some hindered amines, and the like. Such amines are soluble/miscible with water at ambient temperatures at high concentrations that are used in the process to promote capacity and reduce sensible heat requirements. However, conventional capture processes utilizing amine-based capture solutions can suffer from various inherent drawbacks, such as low loading capacity, low absorption rate, low desorption rate (e.g., stripping), and can be cost intensive processes.

While attempts have been made to address such drawbacks using various mono- and polyamines, such amines often lack sufficient water solubility. In particular, such solutions may suffer from precipitate formation during the absorption processes and regeneration processes which can lead to reductions in loading capacity throughout multiple regeneration cycles and even clog process piping. For example, precipitation can occur during an absorption process when a high amount of $CO_2$ has been absorbed by an amine-based capture solution. Precipitation can occur during a regeneration process when too little $CO_2$ remains in the solution and the process temperature is low. In addition, such amines used in the amine-based capture solution also often lack resistance to thermal and oxidative degradation and can have high volatility.

Thus, there is a need to develop new absorption solutions having improved amine solubility and $CO_2$ loading capacity without detriment to other aspects that make such processes economically and environmentally viable.

SUMMARY

The present disclosure relates to absorption media for removal of acid gas components from combustion gases and methods thereof.

In some embodiments, an aqueous composition for removing acid gas components from a process gas includes a first cyclic amine having a substituted carbon atom alpha to an amine atom, and a second cyclic amine having two unsubstituted carbon atoms, wherein each of the unsubstituted carbon atoms is alpha to an amine atom. The composition further includes a molar ratio of the first cyclic amine to the second cyclic amine of about 6:1 to about 2:1.

In some embodiments, an aqueous composition for removing acid gas components from a process gas includes a first cyclic amine including about 20 wt % to about 45 wt % of the composition. The first cyclic amine includes a substituted carbon atom alpha to an amine atom. The composition further includes a second cyclic amine including about 5 wt % to about 15 wt % of the composition. The second cyclic amine includes two unsubstituted carbon atoms, wherein each of the unsubstituted carbon atoms is alpha to an amine atom. The composition further includes a water miscible solvent at least 4 or more —O— or —OH groups.

In some embodiments, a method of treating a process gas includes providing a process gas and an aqueous absorption medium to an absorption tower, and contacting the process gas with the aqueous absorption medium to produce a loaded aqueous absorption medium. The aqueous absorption medium includes about 20 wt % to about 45 wt % of a first cyclic amine having a substituted carbon atom alpha to an amine atom, and about 5 wt % to about 15 wt % of a second cyclic amine having two unsubstituted carbon atoms. Each of the unsubstituted carbon atoms is alpha to an amine atom. The method further includes providing the loaded aqueous absorption medium to a regeneration tower, and desorbing the loaded aqueous absorption medium to form a regenerated aqueous absorption medium. The method further includes recycling the regenerated aqueous absorption medium to the absorption tower.

DETAILED DESCRIPTION

The present disclosure relates to absorption media for removal of acid gas components from combustion gases and methods thereof.

Aqueous absorption media of the present disclosure can remove acid gas components from a process gas by utilizing a sterically hindered cyclic amine and a sterically non-hindered cyclic amine. For example, a molar ratio of the sterically hindered cyclic amine relative to the sterically non-hindered cyclic amine of about 6:1 to about 2:1.

Aqueous absorption media described herein have been found to circumvent solubility limitations commonly associated with removal of various acid gas components from a process gas using conventional amine-based solutions. The composition of such aqueous absorption media of the present disclosure incorporate controlled amounts of both sterically hindered and non-hindered cyclic amines. It has been discovered that aqueous absorption solutions incorporating the molar ratio of a sterically hindered cyclic amine relative to a sterically non-hindered cyclic amine allow for the use of more favorable process conditions for various gas treatment processes. For example, the concentration of each cyclic amine in the aqueous absorption solution can be controlled up to their respective solubility limit such that little or no solid precipitate is able to form in the solution during an absorption process. As a result of such increased solubility control, gas treatment process conditions and variables can be implemented such that acid gas capture efficiency and cost-effectiveness of solutions and processes increase. Furthermore, the aqueous absorption media of the present disclosure can include glycols and/or their mono- and dialkyl ethers may be integrated into the aqueous absorption medium to assist in the solubilization of the cyclic amine without raising concerns of increased solvent emissions commonly associated with other physical solvents used in conventional gas treatment processes. As a result, the aqueous absorption media of the present disclosure have been found to alleviate reductions in $CO_2$ loading capacity throughout multiple regeneration cycles and precipitate formation by limiting the concentration of the cyclic amines within the aqueous absorption media. Furthermore, the reduction in precipitate formation provides benefit to an absorption process by reducing maintenance and downtime resulting from precipitate build-up and clog formation The present disclosure generally relates to processes for removing carbon dioxide ($CO_2$) from combustion gases (e.g., flue gases from reciprocating engines, gas turbine engines, furnaces, and boilers) via contacting such gases with an aqueous absorption medium, for example, at atmospheric pressure. In some embodiments, the aqueous absorption medium can include one or more of an absorbent, a rate promoting component, a solubilizing component, and combinations thereof. In some embodiments, the aqueous absorption medium can include one or more of a sterically hindered cyclic amine, a sterically non-hindered cyclic amine, and optionally a water miscible solvent. In at least one embodiment, sterically hindered cyclic amine can act as the absorbent of the aqueous absorption solution. In at least one embodiment, the sterically non-hindered amine can act as the rate promoting component of the aqueous absorption solution.

In determining amines suitable for use in an absorption medium, a number of properties may be evaluated to determine the usefulness of a particular amine for acidic gas removal. Such properties may include $CO_2$ absorption rate, heat of $CO_2$ desorption, $CO_2$ loading capacity, operating capacity of the absorption medium, thermal and/or oxidative degradation rate of the amine compounds, environmental sensitivity, and volatility. Each of these properties are discussed in more detail below.

The $CO_2$ absorption rate of a particular amine may be useful in determining whether an amine is desirable for acidic gas removal. In general, a greater rate of $CO_2$ absorption will allow for the use of less absorption media, reduced lean loading, or greater rich loading, which in turn can reduce energy consumption. Similarly, a greater heat of $CO_2$ desorption will reduce the energy requirement of an absorber/regenerator relying upon temperature swing regeneration.

As used herein, the term "loading" refers to the moles of $CO_2$ per mole of the amine or other compound that captures the $CO_2$ by absorption. Furthermore, the term "rich loading" refers to the amount of $CO_2$ present in the absorption solution upon exiting an absorption tower. In other words, the term "rich loading" refers to the maximum amount of $CO_2$ that can be absorbed by a portion of the absorption solution under predetermined processing conditions. In contrast, the term "lean loading" refers to the amount of $CO_2$ present in the absorption solution upon exiting a regeneration tower (otherwise referred to as a "desorber"). In other words, the term "lean loading" refers to the minimum amount of $CO_2$ present in the absorption solution once regenerated and recycled back to the absorption tower. As used herein, the terms "$CO_2$-rich solution" and "$CO_2$-lean solution" are synonymous with "rich loaded $CO_2$ solution" and "lean loaded $CO_2$ solution", respectively.

At a given amine concentration, greater loading capacity will also reduce total energy consumption by reducing the sensible heat used for heating the $CO_2$-rich solution upon transfer from the absorption tower to the regeneration tower. As used herein, the term "loading capacity" is the practical difference between the rich loading expected at the bottom of the absorber and the lean loading achieved in the regeneration tower.

The operating capacity of a particular amine may also be useful in determining whether an amine is desirable for acidic gas removal. As used herein, the term "operating capacity" is the loading capacity multiplied by the total concentration of amine. Greater operating capacity reduces the total energy input into the process gas treatment system by reducing the need for sensible heat. As such, the operating capacity of an absorption solution will be significantly lower in a solvent that cannot be operated at a greater concentrations of amine without the precipitation of solids. In other words, amine solubility within the absorption solution throughout the gas treatment process is correlated to the resulting operating capacity.

A reduced rate of thermal degradation of the amine compounds permits an absorption solution to be used at a greater regeneration temperature. With a greater regeneration temperature, temperature swing regeneration can produce acid gas at a greater pressure with savings in capital cost and energy cost.

Furthermore, an amine with a reduced rate of oxidative degradation is attractive because it reduces the makeup cost of the solvent and the cost of secondary impacts (e.g., gas treatment apparatus maintenance, cleaning, and/or other operational downtime) of degradation products. Amine solvents are also more attractive if they are more biodegradable, have less specific toxicity toward plants and animals, and if they are less volatile. Less volatility reduces the costs of makeup and/or water wash systems.

Aqueous Absorption Media

In some embodiments, the aqueous absorption medium includes one or more absorbents, such as one or more sterically hindered cyclic amines. In some embodiments, a sterically hindered cyclic amine can be represented by Formula (I):

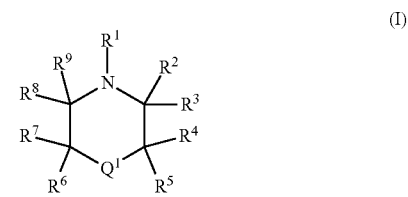

wherein:
  $R^1$ is hydrogen;
  each of $R^2$, $R^3$, $R^4$, $R^5$, $R^6$, $R^7$, $R^8$, and $R^9$ is independently selected from hydrogen, methyl, ethyl, n-propyl, iso-propyl, n-butyl, iso-butyl, and sec-butyl; and $Q^1$ is selected from

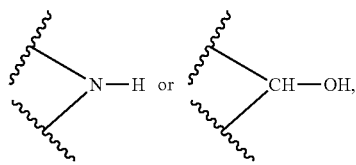

where a wavy line indicates a bonding point to the remainder of the amine of Formula (I).

In some embodiments, each of $R^2$, $R^3$, $R^4$, $R^5$, $R^6$, $R^7$, $R^8$, and $R^9$ of Formula (I) is independently selected from hydrogen or methyl.

In at least one embodiment, each of $R^1$, $R^2$, $R^3$, $R^6$, and $R^7$ of Formula (I) are hydrogen. In at least one embodiment, at least one of $R^4$, $R^5$, $R^8$, and $R^9$ of Formula (I) is methyl. In at least one embodiments $Q^1$ is

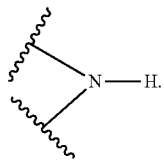

In at least one embodiment, a sterically hindered cyclic amine can be represented by Formula (I) wherein:
- each of $R^1$, $R^2$, $R^3$, $R^6$, and $R^7$ are hydrogen;
- each of $R^4$, $R^5$, $R^8$, and $R^9$ is independently selected from hydrogen or methyl, wherein at least one of $R^4$, $R^5$, $R^8$, and $R^9$ is methyl; and
- $Q^1$ is

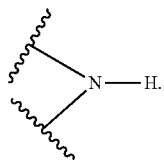

In some embodiments, a sterically hindered cyclic amine can include any one or more e compounds selected from 2-methylpiperazine, 2,5-dimethylpiperazine, 1,3-dimethylpiperazine, 2,3,5,6-tetramethylpiperazine, 4-hydroxy-2,6-dimethylpiperidine, 4-hydroxy-2,2-dimethylpiperidine, and 4-hydroxy-2,2,6,6,-tetramethylpiperidine.

In some embodiments, the aqueous absorption medium includes one or more rate promoting components, such as one or more sterically non-hindered cyclic amines. In some embodiments, a sterically non-hindered cyclic amine can be represented by Formula (II):

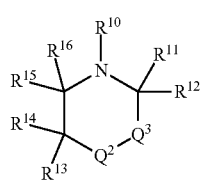

(II)

wherein:
- each of $R^{10}$, $R^{11}$, $R^{12}$, $R^{15}$, and $R^{16}$ is hydrogen;
- each of $R^{13}$, and $R^{14}$ is independently hydrogen, methyl, ethyl, n-propyl, iso-propyl, n-butyl, iso-butyl, and sec-butyl;
- $Q^2$ is selected from

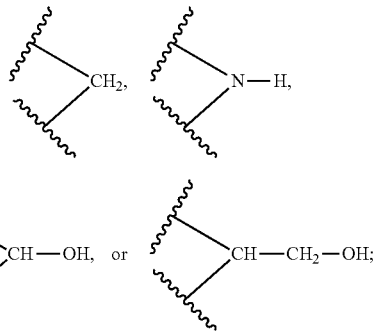

and $Q^3$ is selected from

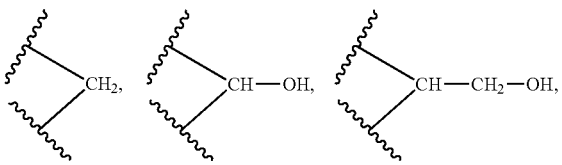

or $Q^3$ is a bond connecting the carbon adjacent to $Q^3$ with $Q^2$,

If $Q^2$ is

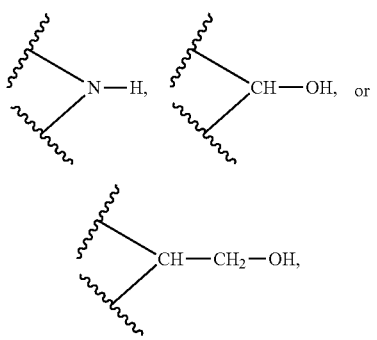

then $Q^3$ is a bond or

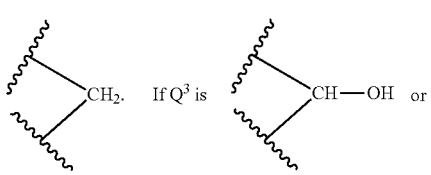

-continued

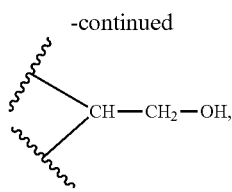

then Q² is

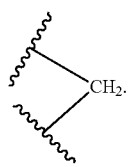

If Q² is

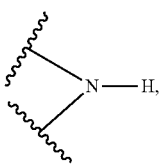

then Q³ is

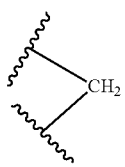

and R¹³ and R¹⁴ are each hydrogen.

In some embodiments, a sterically non-hindered cyclic amine can include any one or more compounds selected from piperazine, 4-hydroxypiperidine, 3-hydroxypiperidine, 4-(hydroxymethyl) piperidine, 3-(hydroxymethyl) piperidine, and 3-hydroxypyrrolidine.

Sterically hindered cyclic amines and sterically non-hindered amines of the present disclosure can be obtained from any suitable commercial source or can be readily synthesized using any suitable method known in the art. For example, a sterically hindered cyclic amine or sterically non-hindered amine can be synthesized by reaction of an ethanolamine and ammonia under pressure and via any suitable catalyst, such as Raney nickel, $2CuOCr_2O_3$, 1 wt % Pd/$Al_2O_3$, 1 wt % Pt/$Al_2O_3$, $TiO_2$, $Al_2O_3$ (nanopowder, acid activated, basic activated), $ZrO_2$ (monoclinic, tetragonal), MgO (nanoactive), $SiO_2$ (catalyst support, fumed), or combinations thereof.

In some embodiments, the aqueous absorption medium may include at least one amine compound represented by Formula (I) and at least one compound represented by Formula (II). Interestingly, it has been discovered that high levels amine compounds represented by Formula (I) and Formula (II) present within the aqueous absorption medium and the molar ratio of such compounds allows for enhancement of $CO_2$ absorption without solubility conerns and/or precipitate formation. In one or more embodiments, the aqueous absorption medium includes a total amine content (total amine compounds) about 5 wt % to about 60 wt %, such as about 15 wt % to about 45 wt %, such as about 35 wt % to about 45 wt %, such as about 35 wt % to about 40 wt %, such as about 35 wt % to about 36 wt %, about 36 wt % to about 37 wt %, about 37 wt % to about 38 wt %, about 38 wt % to about 39 wt %, or about 39 wt % to about 40 wt %, alternatively about 40 wt % to about 45 wt %, such as about 40 wt % to about 41 wt %, about 41 wt % to about 42 wt %, about 42 wt % to about 43 wt %, about 43 wt % to about 44 wt %, or about 44 wt % to about 45 wt %. Alternatively, the aqueous absorption medium includes a total amine content of about 5 wt % to about 15 wt %, alternatively about 15 wt % to about 35 wt %, alternatively about 45 wt % to about 50 wt %. In at least one embodiment, the aqueous absorption medium includes a concentration of amine containing compounds of about 0.5 M to about 16.1 M, such as about 5.4 M to about 8.8 M, such as about 5.8 M to about 8.3 M.

In some embodiments, the aqueous absorption medium includes one or more compounds represented by Formula (I) in an amount of about 5 wt % to about 50 wt %, such as about 15 wt % to about 45 wt %, such as about 20 wt % to about 45 wt %, such as about 20 wt % to about 30 wt %, such as about 22 wt % to about 28 wt %, such as about 23 wt % to about 27 wt %, such as about 24 wt % to about 26 wt %, such as about 25 wt %, alternatively about 20 wt % to about 22 wt %, alternatively about 22 wt % to about 24 wt %, alternatively about 24.5 wt % to about 25.5 wt %, alternatively about 25 wt % to about 27 wt %, alternatively about 27 wt % to about 29 wt %, alternatively about 28 wt % to about 30 wt %, alternatively about 35 wt % to about 45 wt %, such as about 35 wt % to about 40 wt %, such as about 35 wt % to about 36 wt %, about 36 wt % to about 37 wt %, about 37 wt % to about 38 wt %, about 38 wt % to about 39 wt %, or about 39 wt % to about 40 wt %, alternatively about 40 wt % to about 45 wt %, such as about 40 wt % to about 41 wt %, about 41 wt % to about 42 wt %, about 42 wt % to about 43 wt %, about 43 wt % to about 44 wt %, or about 44 wt % to about 45 wt %. In at least one embodiment, the aqueous absorption medium includes a concentration of an amine containing compound represented by Formula (I) of about 0.5 M to about 10 M, such as about 5.4 M to about 9 M, such as about 6.7 M to about 8.2 M.

In some embodiments, the aqueous absorption medium includes one or more compounds represented by Formula (II) in an amount of about 5 wt % to about 50 wt %, such as about 5 wt % to about 35 wt %, such as about 5 wt % to about 15 wt %, such as about 5 wt % to about 10 wt %, such as about 5 wt % to about 6 wt %, about 6 wt % to about 7 wt %, about 7 wt % to about 8 wt %, about 8 wt % to about 9 wt %, or about 9 wt % to about 10 wt %, alternatively about 10 wt % to about 15 wt %, such as about 10 wt % to about 11 wt %, about 11 wt % to about 12 wt %, about 12 wt % to about 13 wt %, about 13 wt % to about 14 wt %, or about 14 wt % to about 15 wt %. In at least one embodiment, the aqueous absorption medium includes a concentration of an amine containing compound represented by Formula (II) of about 0.6 M to about 11.6 M, such as about 0.6 M to about 2.1 M, such as about 1.3 M to about 2.1 M.

In some embodiments, the aqueous absorption medium includes at least one compound represented by Formula (I) and at least one compound represented by Formula (II) in a molar ratio of about 10:1 to about 1:1, such as about 6:1 to about 1:1, such as about 5:1 to about 1:1. In some embodiments, the molar ratio of compounds represented by Formula (I) relative to Formula (II) present within the aqueous organic compound is about 8:1 to about 1:1, such as about 7:1 to about 2:1, such as about 6:1 to about 2:1, such as about 3:1 to about 2:1. In at least one embodiment, the aqueous absorption medium includes a concentration of an amine containing compound represented by Formula (I) of about 0.3 M to about 13.8 M, such as about 0.3 M to about 7.1 M, such as about 4.4 M to about 7.1 M. In at least one embodiment, the aqueous absorption medium includes a concentration of an amine containing compound represented by Formula (II) of about 0.3 M to about 1.4 M, such as about 0.3 M to about 1.2 M, such as about 1.1 M to about 1.2 M.

In at least one embodiment, the aqueous absorption medium includes 2-methylpiperazine and piperazine. In some embodiments, the aqueous absorption medium includes a total amine content (e.g., 2-methylpiperazine+piperazine) of about 5 wt % to about 50 wt %, such as about 15 wt % to about 45 wt %, such as about 35 wt % to about 45 wt %. In one or more embodiments, the aqueous absorption medium includes 2-methylpiperazine in an amount of about 5 wt % to about 50 wt %, such as about 15 wt % to about 45 wt %, such as about 35 wt % to about 45 wt %, such as about 35 wt % to about 40 wt %, such as about 35 wt % to about 36 wt %, about 36 wt % to about 37 wt %, about 37 wt % to about 38 wt %, about 38 wt % to about 39 wt %, or about 39 wt % to about 40 wt %, alternatively about 40 wt % to about 45 wt %, such as about 40 wt % to about 41 wt %, about 41 wt % to about 42 wt %, about 42 wt % to about 43 wt %, about 43 wt % to about 44 wt %, or about 44 wt % to about 45 wt %.

In one or more embodiments, the aqueous absorption medium includes piperazine in an amount of about 5 wt % to about 50 wt %, such as about 5 wt % to about 35 wt %, such as about 5 wt % to about 15 wt %, such as about 5 wt % to about 10 wt %, such as about 5 wt % to about 6 wt %, about 6 wt % to about 7 wt %, about 7 wt % to about 8 wt %, about 8 wt % to about 9 wt %, or about 9 wt % to about 10 wt %, alternatively about 10 wt % to about 15 wt %, such as about 10 wt % to about 11 wt %, about 11 wt % to about 12 wt %, about 12 wt % to about 13 wt %, about 13 wt % to about 14 wt %, or about 14 wt % to about 15 wt %. In at least one embodiment, the molar ratio of 2-methylpiperazine to piperazine present within the aqueous absorption medium is about 8:1 to about 1:1, such as about 7:1 to about 2:1, such as about 6:1 to about 2:1, such as about 3:1 to about 2:1.

In some embodiments, the aqueous absorption medium can include one or more solvents, such as a water miscible solvent. Without being bound by theory, the one or more solvents included within the aqueous absorption medium provide increased solubility of the one or more cyclic amines present within the aqueous absorption medium. In at least one embodiment, the aqueous absorption medium includes one or more water miscible solvents in an amount of about 10 wt % to about 50 wt %, such as about 10 wt % to about 30 wt %, such as about 30 wt % to about 50 wt %. In at least one embodiment, the aqueous absorption medium has a shear viscosity of about 5 cP to about 25 cP, such as about 5 cP to about 20 cP, such as about 5 cP to about 15 cP, such as about 5 cP to about 10, such as about 5 cP to about 6 cP, such as about 6 cP to about 7 cP, such as about 7 cP to about 8 cP, such as about 8 cP to about 9 cP, such as about 9 cP to about 10 cP, such as about 10 cP to about 11 cP, such as about 11 cP to about 12 cP, such as about 12 cP to about 13 cP, such as about 13 cP to about 14 cP, such as about 14 cP to about 15 cP, such as about 15 cP to about 16 cP, such as about 16 cP to about 17 cP, such as about 17 cP to about 18 cP, such as about 18 cP to about 19 cP, such as about 19 cP to about 20 cP.

In some embodiments, the one or more solvents of the aqueous medium can include any water miscible solvent. In one or more embodiment, a water miscible solvent can include one or more glycols and/or monodialkyl ethers having at least 4 —O— or —OH groups. In at least one embodiment, the water miscible solvent can be selected from triethylene glycol, tripropylene glycol methyl ether, triglyme, tetraglyme, or combinations thereof.

As described herein, an aqueous absorption medium can include the components of the medium (e.g., sterically hindered amine, sterically unhindered amine, water miscible solvent, etc.) and/or reaction product(s) of two or more of the components of the aqueous absorption medium.

Methods of Use

An aqueous absorption medium of the present disclosure can find utility in various industries, such as the petrochemical and energy industries, for treatment of various process streams, gases, liquids, or combinations thereof. Such fluid streams may include any one or more acid gas contaminants, such as $CO_2$, $N_2$, $CH_4$, $C_2H_6$, $C_3H_3$, $H_2$, CO, $H_2O$, HCN, $NH_3$, $O_2$, or mercaptans (e.g., $H_2S$ or COS). Often such gas contaminants are found in combustion gases, refinery gases, natural gas, syn gas, tail gas, propane, propylene, heavy hydrocarbon gases, etc. An aqueous absorption medium of the present disclosure is effective at removing, collecting, and/or storing one or more of such acid gas contaminants from a process gas stream.

Generally, acid gas components may be removed from a process stream by bringing into contact the process stream with a suitable absorbent, such as an aqueous absorption medium of the present disclosure. In the context of the present disclosure, $CO_2$ may be removed from a combustion gas stream by contacting the process stream with an aqueous absorption medium, via any one or more processes and/or apparatuses known to one of ordinary skill in the art. The contacting of an aqueous absorption medium and the process gas stream may take place in any suitable contacting tower (s). In such processes, the process gas steam may be brought into contact with an absorbing medium using one or more conventional apparatuses, such as a tower packed with, for example, ceramic rings or saddles or with bubble cap plates or sieve plates, or a bubble reactor.

In some embodiments, $CO_2$ and other acid gas components may be removed from a process gas via an absorption process. In at least one embodiment, the absorption process may be conducted by feeding the process gas into the base of an absorption tower while fresh and/or regenerated aqueous absorption medium is fed into the top of said tower. The $CO_2$ of the process gas is absorbed into the aqueous absorption medium by countercurrent contact of the two components. As such, the process gas stream progresses upwards through the aqueous absorption medium wherein the $CO_2$ and/or other additional acid gas components are at least partially removed from therefrom, forming a cleaned process gas and a loaded aqueous absorption medium. The cleaned process gas is then allowed to emerge from the upper portion of the absorption tower via an exhaust port, and the loaded aqueous absorption medium leaves the absorption tower at or near the lower portion of the tower.

In some embodiments, the temperature of the absorption tower during the absorption process is about 25° C. to about 90° C., such as about 30° C. to about 80° C., such as about 30° C. to about 70° C. In some embodiments, the pressure in the absorption tower during the absorption process is about 5 psig to about 1,500 psig, such as about 50 psig to about 1,250 psig, such as about 100 psig to about 1,000 psig, alternatively about 5 psig to about 50 psig, such as about 5 psig to about 25 psig. The contacting takes place under conditions such that the $CO_2$ and/or other acid gas component(s) are absorbed by the aqueous absorption medium from the process gas. In one or more embodiments, the process gas is introduced to the absorption tower and/or the aqueous absorption medium at a gas velocity of about 5 ft/sec to about 0.1 ft/sec, such as about 2.5 ft/sec to about 0.2 ft/sec, such as about 1 ft/sec to about 0.3 ft/sec. During the absorption process, the medium is maintained in a single phase.

The parameters of the absorption process and/or the composition of the aqueous absorption process may be adjusted such that the $CO_2$ loading capacity of the aqueous absorption medium and $CO_2$ absorption rate are maximized, while also minimizing the residence time requirement of the aqueous absorption medium within the absorption tower.

In some embodiments, the absorption process may include an aqueous absorption medium composition and process parameters suitable to substantially saturate the aqueous absorption medium with the one or more acid gas components (e.g., $CO_2$). In such embodiments, the loading capacity of the aqueous absorption medium used in the absorption process is about 0.01 mol $CO_2$/mol amine to about 1.5 mol $CO_2$/mol amine, such as about 0.01 mol $CO_2$/mol amine to about 1.0 mol $CO_2$/mol amine, such as about 0.01 mol $CO_2$/mol amine to about 0.5 mol $CO_2$/mol amine.

In some embodiments, the process gas may be contacted with the aqueous absorption medium to remove the one or more acid gas components therefrom (e.g., $CO_2$) such that the aqueous absorption medium is substantially saturated with the one or more acid components. In one or more embodiments, the process gas may be contacted with the aqueous absorption medium for a residence time sufficient to absorb the one or more acid gas components therefrom (e.g., $CO_2$) such that great than about 85% of the loading capacity of the aqueous absorption medium is utilized, such as greater than about 90%, such as greater than about 95%. In at least one embodiment, the process gas may be contacted with the aqueous absorption medium for a residence time sufficient to absorb the one or more acid gas components therefrom (e.g., $CO_2$) such that about 85% to about 99.9% of the loading capacity of the aqueous absorption medium is utilized, such as about 90% to about 99.9%, such as about 95% to about 99.9%.

In some embodiments, the aqueous absorption medium may be regenerated from the loaded aqueous absorption medium via a regeneration process, wherein the one or more acid gas components (e.g., $CO_2$) may be desorbed from the aqueous absorption medium and collected via any one or more suitable processes. As such, the regeneration process may be conducted in a single liquid phase. In which case, the loaded aqueous absorption medium is progressed from the bottom portion of the absorption tower to a regeneration tower. Regeneration or desorption of the acid gas components (e.g., $CO_2$) from the loaded aqueous absorption medium may be accomplished by any one or more suitable processes, such as heating, expansion, stripping with an inert fluid, or combinations thereof. In at least one embodiment, the regeneration process includes a pressure reduction step, which causes the one or more acid gas components (e.g., $CO_2$) to flash off in the regeneration tower, and passing an inert gas (e.g., air, nitrogen, and/or steam) upward through the regeneration tower. The aqueous absorption medium, after being cleansed of at least a portion of the one or more acid gas components (e.g., $CO_2$), may be recycled back to the absorbing tower. In at least one embodiment, additional fresh aqueous absorption medium may be added to the absorption tower with the regenerated aqueous absorption medium to provide adequate amounts of the absorption medium to allow for high $CO_2$ loading capacity, high absorption rate, and low residence time of the aqueous absorption medium in the absorbing tower.

In some embodiments, the temperature of the regeneration tower during the regeneration process ranges from about 50° C. to about 160° C., such as about 80° C. to about 160° C., such as about 110° C. to about 160° C. In some embodiments, the pressure within the regeneration tower during the regeneration process ranges from about 5 psig to about 50 psig, such as about 15 psig to about 45 psig, such as about 20 psig to about 40 psig, alternatively about 5 psig to about 15 psig, such as about 5 psig to about 10 psig. In one or more embodiments, the regeneration process removes about 90% to about 99.9% of the acid gas components within the loaded aqueous absorption medium, such as about 92.5% to about 99.9%, such as about 95% to about 99.9%. In at least one embodiment, the regeneration process removes about 90% to about 99.9% of $CO_2$ within the loaded aqueous absorption medium, such as about 92.5% to about 99.9%, such as about 95% to about 99.9%.

In at least one embodiment, the process of the present disclosure may substantially and/or completely remove $CO_2$ and/or other acid gases from a process stream via a continuous process by: (1) contacting the process stream with an aqueous absorption medium under conditions whereby the $CO_2$ in the feed gas is absorbed into the aqueous absorption medium to produce a loaded aqueous absorption medium, (2) regenerating the aqueous absorption medium under conditions suitable for $CO_2$ desorption from the loaded aqueous absorption medium, and (3) recycling the regenerated aqueous absorption medium back into the absorption tower. In at least one embodiment, the regenerated aqueous absorption medium may be combined with fresh aqueous absorption medium. Such sequential process steps may be cyclically conducted so as to produce a constant/continuous process for removing acid gas components from a readily available process gas feed.

In some embodiments, the time of contacting (otherwise referred to as "residence time") the process gas with the aqueous absorption medium within the absorption tower may range from about 1 min to about 60 min, such as about 10 min to about 60 min, such as about 30 min to about 60 min.

In some embodiments, the substantially saturated aqueous absorption medium may be substantially regenerated by processes employing higher desorber pressures relative to conventional regeneration processes. Such higher desorber pressures can be advantageous in terms of cost effectiveness, as the target pressure of the desorber is closer to the pressure implemented in the absorption tower thus reducing the need for a pressure reduction step. In at least one embodiment, the regeneration process may be performed at a pressure of about 5 psig to about 50 psig, such as about 15 psig to about 45 psig, such as about 20 psig to about 40 psig. In at least one embodiment, the regeneration process may be performed at a temperature of about 50° C. to about 160° C., such as about 80° C. to about 160° C., such as about 110° C. to about 160° C. In at least one embodiment, the one or more acid gas components (e.g., $CO_2$) may be desorbed from the aqueous absorption medium such that greater than about 85% of the original loading capacity is regenerated, such as greater than about 90%, such as greater than about 99.9%. In at least one embodiment, the one or more acid gas components (e.g., $CO_2$) may be desorbed from the aqueous absorption medium such that about 85% to about 99.9% of the original loading capacity is regenerated, such as about 90% to about 99.9%, such as about 95% to about 99.9%.

The concentration of each cyclic amine component included within an aqueous absorption medium is controlled up to their respective solubility limit at about 30° C., such that no or substantially no precipitate would be able to form at absorption temperatures employed during operation of the above described processes, such as any one or more of the absorption operations. By limiting the concentration of the cyclic amines within their solubility limits, substantially all of the acid gas components (e.g., substantially all of the absorbed $CO_2$) may be stripped from the loaded aqueous absorption medium during the one or more regeneration operations of the above described processes. Additionally, limiting the concentration of the cyclic amines within the aqueous absorption medium mitigates concerns of solvent precipitation during regeneration of the aqueous absorption medium. Such solvent precipitation mitigation is particularly advantageous when targeting the removal of substantially high levels of one or more acid gas components (e.g., removal of greater than about 95% of the absorbed $CO_2$) from a loaded aqueous absorption medium. Without being bound by theory, the $CO_2$ loading capacity of the aqueous absorption medium is proportional to the amine concentration therein. As such, if solvent precipitation were to occur during the regeneration step, the loading capacity of the resulting regenerated aqueous medium would decrease and/or continuously decrease throughout the one or more absorption and regeneration steps. Interestingly, the aqueous absorption media of the present disclosure can mitigate such reductions in loading capacity and regeneration precipitations by limiting the concentration of the cyclic amines within the aqueous absorption medium without sacrificing an ability of the medium to absorb $CO_2$.

As previously mentioned, the $CO_2$ capacity of an aqueous absorption medium is proportional to the amine concentration therein. As such, it is preferable to integrate high concentrations of cyclic amines if solubility allows. Such solubility concerns of cyclic amines within aqueous media may be mitigated by replacing at least a portion of the water within the aqueous absorption medium with a physical solvent that is water miscible. However, common physical solvents used in conventional pressure gas treatment processes are often either too volatile in exhaust gas applications, or can rapidly react with amines within the aqueous absorption medium at regeneration temperatures to reduce both amine and physical solvent concentration therein. Interestingly, it has been found that glycols and their mono- and dialkyl ethers having 4 or more —O— or —OH groups can be used to solubilize various cyclic amines and cyclic amine combination(s) when integrated within aqueous absorption media of the present disclosure without a concurrent reduction in solvent stability. Further, integration of such glycols and mono- and dialkyl ethers may alleviate concerns of increased solvent emissions commonly associated with other physical solvents used in conventional pressure gas treatment processes.

Glycols of the present disclosure can be obtained from any suitable commercial source or can be readily synthesized using any suitable method known in the art.

Additional Aspects

The present disclosure provides, among others, the following aspects, each of which may be considered as optionally including any alternate aspects.

Clause 1. A composition for removing acid gas components from a process gas, the composition comprising:
a sterically hindered cyclic amine; and
a sterically non-hindered cyclic amine.

Clause 2. The composition of clause 1, wherein the composition is an aqueous composition.

Clause 3. The composition of any clauses 1-2, wherein the sterically hindered cyclic amine can be represented by Formula (I):

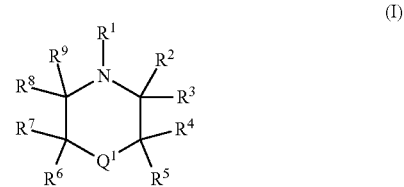

wherein:
$R^1$ is hydrogen;
each of $R^2$, $R^3$, $R^4$, $R^5$, $R^6$, $R^7$, $R^8$, and $R^9$ is independently selected from hydrogen, methyl, ethyl, n-propyl, iso-propyl, n-butyl, iso-butyl, and sec-butyl; and
$Q^1$ is selected from

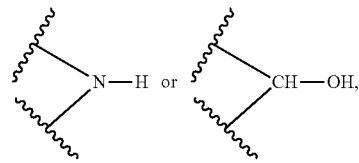

wherein a wavy line indicates a bonding point to the remainder of the amine of Formula (I).

Clause 5. The composition of any clauses 1-4, wherein the sterically hindered cyclic amine is selected from the group consisting of 2-methylpiperazine, 2,5-dimethylpiperazine, 1,3-dimethylpiperazine, 2,3,5,6-tetramethylpiperazine, 4-hydroxy-2,6-dimethylpiperidine, 4-hydroxy-2,2-dimethylpiperidine, 4-hydroxy-2,2,6,6,-tetramethylpiperidine, and combinations thereof.

Clause 6. The composition of any clauses 1-5, wherein the sterically hindered cyclic amine is 2-methylpiperazine.

Clause 7. The composition of any clauses 1-6, wherein the sterically non-hindered cyclic amine can be represented by Formula (II):

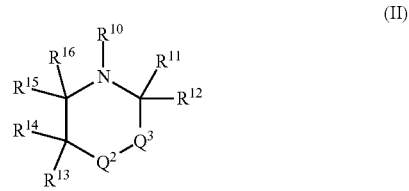

wherein:
each of $R^{10}$, $R^{11}$, $R^{12}$, $R^{15}$, and $R^{16}$ is hydrogen;
each of $R^{13}$, and $R^{14}$ is independently hydrogen, methyl, ethyl, n-propyl, iso-propyl, n-butyl, iso-butyl, and sec-butyl;

$Q^2$ is selected from and

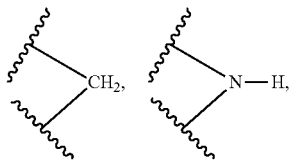

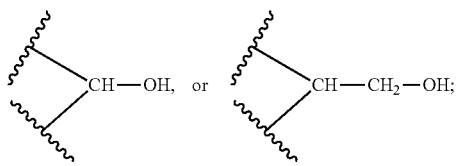

$Q^3$ is selected from

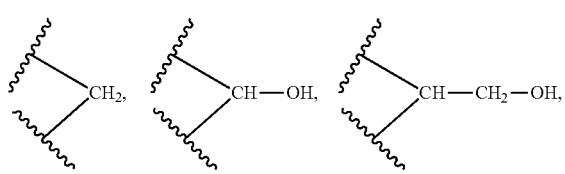

or $Q^3$ is a bond connecting the carbon adjacent to $Q^3$ with $Q^2$, wherein if $Q^2$ is

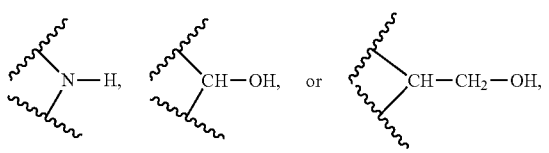

then $Q^3$ is a bond or

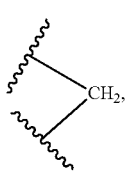

wherein if $Q^3$ is

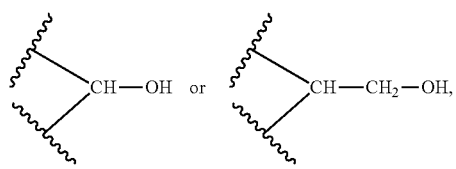

then $Q^2$ is

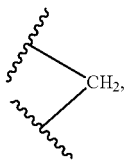 [SMILES: *C*]

wherein if $Q^2$ is

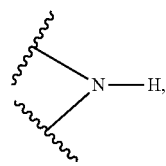

then $Q^3$ is

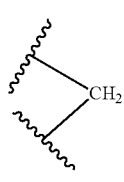 [SMILES: *C*]

and $R^{13}$ and $R^{14}$ are each hydrogen, wherein a wavy line indicates a bonding point to the remainder of the amine of Formula (II).

Clause 8. The composition of any clauses 1-7, wherein the sterically non-hindered amine is selected from the group consisting of piperazine, 4-hydroxypiperidine, 3-hydroxypiperidine, 4-(hydroxymethyl) piperidine, 3-(hydroxymethyl) piperidine, 3-hydroxypyrrolidine, and combinations thereof.

Clause 9. The composition of any clauses 1-8, wherein the sterically non-hindered amine is piperazine.

Clause 10. The composition of any clauses 2-9, wherein the composition comprises a total amine content of up to about 55 wt %.

Clause 11. The composition of any clauses 2-10, wherein the composition comprises a total amine content of about 5 wt % to about 50 wt %.

Clause 12. The composition of any clauses 2-11, wherein the composition comprises a total amine content of about 35 wt % to about 45 wt %.

Clause 13. The composition of any clauses 2-12, wherein the composition comprises the sterically hindered cyclic amine in an amount of up to about 45 wt %.

Clause 14. The composition of any clauses 2-13, wherein the composition comprises the sterically hindered cyclic amine in an amount of about 15 wt % to about 45 wt %.

Clause 15. The composition of any clauses 2-14, wherein the composition comprises the sterically hindered cyclic amine in an amount of about 20 wt % to about 30 wt %.

Clause 16. The composition of any clauses 2-15, wherein the composition comprises the sterically non-hindered cyclic amine in an amount of up to about 45 wt %.

Clause 17. The composition of any clauses 2-16, wherein the composition comprises the sterically non-hindered cyclic amine in an amount of about 5 wt % to about 35 wt %.

Clause 18. The composition of any clauses 2-17, wherein the composition comprises the sterically non-hindered cyclic amine in an amount of about 5 wt % to about 15 wt %.

Clause 19. The composition of any clauses 1-18, wherein the composition comprises a molar ratio of the sterically hindered cyclic amine relative to the sterically non-hindered cyclic amine of about 8:1 to about 1:1.

Clause 20. The composition of any clauses 1-19, wherein the composition comprises a molar ratio of the sterically hindered cyclic amine relative to the sterically non-hindered cyclic amine of about 7:1 to about 2:1.

Clause 21. The composition of any clauses 1-20, wherein the composition comprises a molar ratio of the sterically hindered cyclic amine relative to the sterically non-hindered cyclic amine of about 6:1 to about 2:1.

Clause 22. The composition of any clauses 1-21, wherein the composition comprises a molar ratio of the sterically hindered cyclic amine relative to the sterically non-hindered cyclic amine of about 3:1 to about 2:1.

Clause 23. The composition of any clauses 1-22, wherein the composition further comprises a water miscible solvent comprising at least 4 or more —O— or —OH groups.

Clause 24. The composition of clause 23, wherein the composition comprises the water miscible solvent in an amount of up to about 50 wt %.

Clause 25. The composition of any clauses 23-24, wherein the composition comprises the water miscible solvent in an amount of 10 wt % to about 50 wt %.

Clause 26. The composition of any clauses 2-25, wherein the composition comprises a shear viscosity of up to about 20 cP at 40° C.

Clause 27. A composition for removing acid gas components from a process gas, the composition comprising:
a sterically hindered cyclic amine; and
a sterically non-hindered cyclic amine, wherein:
the composition comprises a molar ratio of the sterically hindered cyclic amine relative to the sterically non-hindered cyclic amine of about 8:1 to about 1:1.

Clause 28. The composition of clause 27, wherein the composition is an aqueous composition.

Clause 29. The composition of any clauses 27-28, wherein the sterically hindered cyclic amine can be represented by Formula (I):

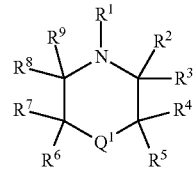

(I)

wherein:
$R^1$ is hydrogen;
each of $R^2$, $R^3$, $R^4$, $R^5$, $R^6$, $R^7$, $R^8$, and $R^9$ is independently selected from hydrogen, methyl, ethyl, n-propyl, iso-propyl, n-butyl, iso-butyl, and sec-butyl; and $Q^1$ is selected from

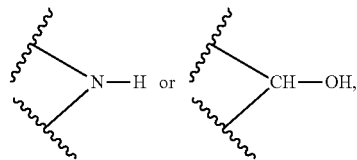

wherein a wavy line indicates a bonding point to the remainder of the amine of Formula (I).

Clause 30. The composition of clause 29, wherein each of $R^2$, $R^3$, $R^4$, $R^5$, $R^6$, $R^7$, $R^8$, and $R^9$ of Formula (I) is independently selected from a hydrogen or a methyl.

Clause 31. The composition of any clauses 27-30, wherein the sterically hindered cyclic amine is selected from the group consisting of 2-methylpiperazine, 2,5-dimethylpiperazine, 1,3-dimethylpiperazine, 2,3,5,6-tetramethylpiperazine, 4-hydroxy-2,6-dimethylpiperidine, 4-hydroxy-2,2-dimethylpiperidine, 4-hydroxy-2,2,6,6,-tetramethylpiperidine, and combinations thereof.

Clause 32. The composition of any clauses 27-31, wherein the sterically hindered cyclic amine is 2-methylpiperazine.

Clause 33. The composition of any clauses 27-32, wherein the sterically non-hindered cyclic amine can be represented by Formula (II):

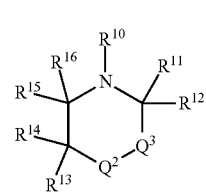

(II)

wherein:
each of $R^{10}$, $R^{11}$, $R^{12}$, $R^{15}$, and $R^{16}$ is hydrogen;
each of $R^{13}$, and $R^{14}$ is independently hydrogen, methyl, ethyl, n-propyl, iso-propyl, n-butyl, iso-butyl, and sec-butyl;
$Q^2$ is selected from

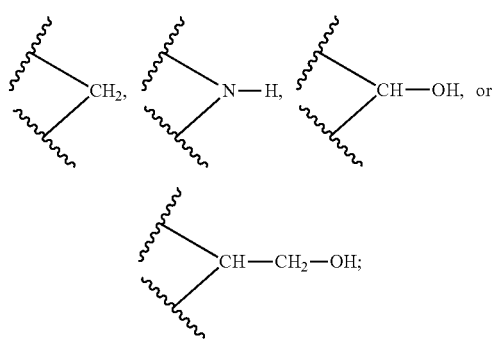

and
Q³ is selected from

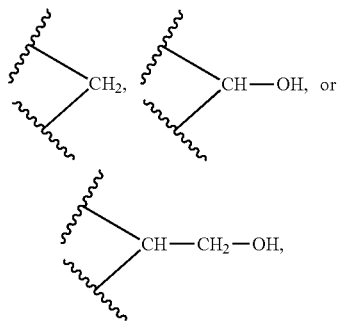

or Q³ is a bond connecting the carbon adjacent to Q³ with Q², wherein if Q² is

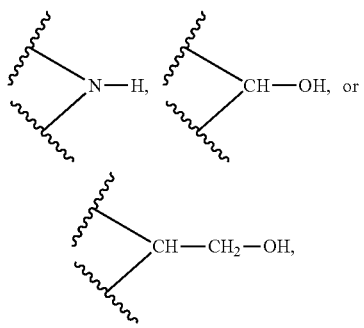

then Q³ is a bond or

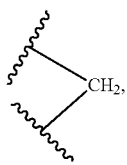 [SMILES: *C*]

wherein if Q³ is

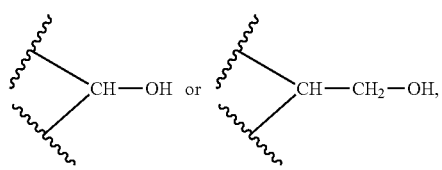

then Q² is

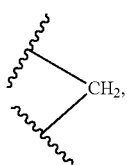

wherein if Q² is

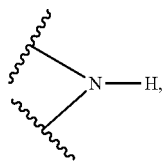

then Q³ is

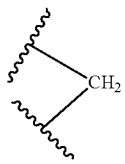 [SMILES: *C*]

and R¹³ and R¹⁴ are each hydrogen, wherein a wavy line indicates a bonding point to the remainder of the amine of Formula (II).

Clause 34. The composition of any clauses 27-33, wherein the sterically non-hindered amine is selected from the group consisting of piperazine, 4-hydroxypiperidine, 3-hydroxypiperidine, 4-(hydroxymethyl) piperidine, 3-(hydroxymethyl) piperidine, 3-hydroxypyrrolidine, and combinations thereof.

Clause 35. The composition of any clauses 27-34, wherein the sterically non-hindered amine is piperazine.

Clause 36. The composition of any clauses 28-35, wherein the composition comprises a total amine content of up to about 55 wt %.

Clause 37. The composition of any clauses 28-36, wherein the composition comprises a total amine content of about 5 wt % to about 50 wt %.

Clause 38. The composition of any clauses 28-37, wherein the composition comprises a total amine content of about 35 wt % to about 45 wt %.

Clause 39. The composition of any clauses 28-38, wherein the composition comprises the sterically hindered cyclic amine in an amount of up to about 45 wt %.

Clause 40. The composition of any clauses 28-39, wherein the composition comprises the sterically hindered cyclic amine in an amount of about 20 wt % to about 30 wt %.

Clause 41. The composition of any clauses 28-40, wherein the composition comprises the sterically hindered cyclic amine in an amount of about 23 wt % to about 27 wt %.

Clause 42. The composition of any clauses 28-41, wherein the composition comprises the sterically non-hindered cyclic amine in an amount of up to about 45 wt %.

Clause 43. The composition of any clauses 28-42, wherein the composition comprises the sterically non-hindered cyclic amine in an amount of about 5 wt % to about 35 wt %.

Clause 44. The composition of any clauses 28-43, wherein the composition comprises the sterically non-hindered cyclic amine in an amount of about 5 wt % to about 15 wt %.

Clause 45. The composition of any clauses 27-44, wherein the composition comprises the molar ratio of the sterically hindered cyclic amine relative to the sterically non-hindered cyclic amine of about 7:1 to about 2:1.

Clause 46. The composition of any clauses 27-45, wherein the composition comprises the molar ratio of the sterically hindered cyclic amine relative to the sterically non-hindered cyclic amine of about 6:1 to about 2:1.

Clause 47. The composition of any clauses 27-46, wherein the composition comprises a molar ratio of the sterically hindered cyclic amine relative to the sterically non-hindered cyclic amine of about 5:1.

Clause 48. The composition of any clauses 27-47, wherein the composition further comprises a water miscible solvent selected from the group consisting of triethylene glycol, tripropylene glycol methyl ether, triglyme, tetraglyme, and combinations thereof.

Clause 49. The composition of clause 48, wherein the composition comprises the water miscible solvent in an amount of up to about 50 wt %.

Clause 50. The composition of any clauses 48-49, wherein the composition comprises the water miscible solvent in an amount of 10 wt % to about 50 wt %.

Clause 51. The composition of any clauses 28-50, wherein the composition comprises a shear viscosity of up to about 20 cP at 40° C.

Clause 52. An aqueous composition for removing acid gas components from a process gas, the composition comprising:
a sterically hindered cyclic amine; and
a sterically non-hindered cyclic amine, wherein:
the composition comprises a molar ratio of the sterically hindered cyclic amine relative to the sterically non-hindered cyclic amine of about 6:1 to about 2:1.

Clause 53. The composition of clause 52, wherein the sterically hindered cyclic amine can be represented by Formula (I):

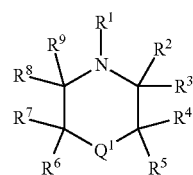

(I)

wherein:
$R^1$ is hydrogen;
each of $R^2$, $R^3$, $R^4$, $R^5$, $R^6$, $R^7$, $R^8$, and $R^9$ is independently selected from hydrogen, methyl, ethyl, n-propyl, iso-propyl, n-butyl, iso-butyl, and sec-butyl; and
$Q^1$ is selected from

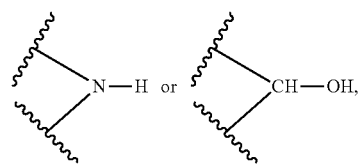

where a wavy line indicates a bonding point to the remainder of the amine of Formula (I).

Clause 54. The composition of clause 53, wherein each of $R^2$, $R^3$, $R^4$, $R^5$, $R^6$, $R^7$, $R^8$, and $R^9$ of Formula (I) is independently selected from a hydrogen or a methyl.

Clause 55. The composition of any clauses 52-54, wherein the sterically hindered cyclic amine is selected from the group consisting of 2-methylpiperazine, 2,5-dimethylpiperazine, 1,3-dimethylpiperazine, 2,3,5,6-tetramethylpiperazine, 4-hydroxy-2,6-dimethylpiperidine, 4-hydroxy-2,2-dimethylpiperidine, 4-hydroxy-2,2,6,6,-tetramethylpiperidine, and combinations thereof.

Clause 56. The composition of any clauses 52-55, wherein the sterically hindered cyclic amine is 2-methylpiperazine.

Clause 57. The composition of any clauses 52-56, wherein the sterically non-hindered cyclic amine can be represented by Formula (II):

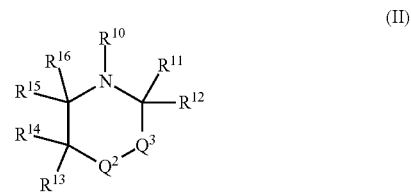

(II)

wherein:
each of $R^{10}$, $R^{11}$, $R^{12}$, $R^{15}$, and $R^{16}$ is hydrogen;
each of $R^{13}$, and $R^{14}$ is independently hydrogen, methyl, ethyl, n-propyl, iso-propyl, n-butyl, iso-butyl, and sec-butyl;
$Q^2$ is selected from

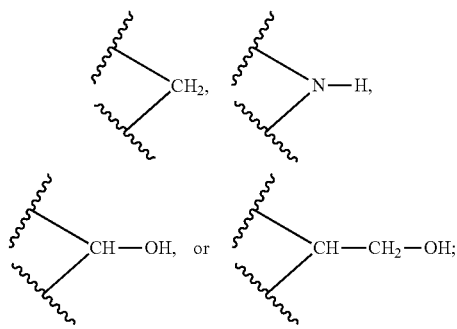

and
$Q^3$ is selected from

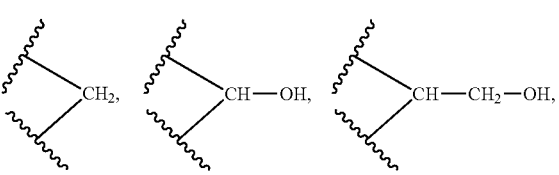

or $Q^3$ is a bond connecting the carbon adjacent to $Q^3$ with $Q^2$, wherein if $Q^2$ is

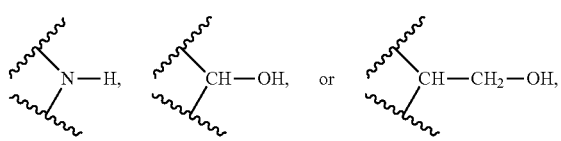

then $Q^3$ is a bond or

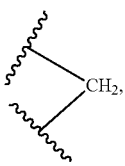

wherein if $Q^3$ is

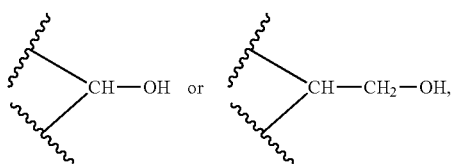

then $Q^2$ is

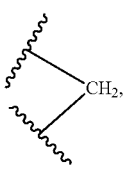 [SMILES: *C*]

wherein if $Q^2$ is

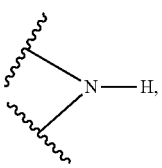

then $Q^3$ is

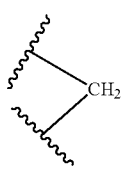

and $R^{13}$ and $R^{14}$ are each hydrogen, wherein a wavy line indicates a bonding point to the remainder of the amine of Formula (II).

Clause 58. The composition of any clauses 52-57, wherein the sterically non-hindered amine is selected from the group consisting of piperazine, 4-hydroxypiperidine, 3-hydroxypiperidine, 4-(hydroxymethyl) piperidine, 3-(hydroxymethyl) piperidine, 3-hydroxypyrrolidine, and combinations thereof.

Clause 59. The composition of any clauses 52-58, wherein the sterically non-hindered amine is piperazine.

Clause 60. The composition of any clauses 52-59, wherein the composition comprises a total amine content of up to about 55 wt %.

Clause 61. The composition of any clauses 52-60, wherein the composition comprises a total amine content of about 5 wt % to about 50 wt %.

Clause 62. The composition of any clauses 52-61, wherein the composition comprises a total amine content of about 35 wt % to about 45 wt %.

Clause 63. The composition of any clauses 52-62, wherein the composition comprises the sterically hindered cyclic amine in an amount of up to about 45 wt %.

Clause 64. The composition of any clauses 52-63, wherein the composition comprises the sterically hindered cyclic amine in an amount of about 15 wt % to about 45 wt %.

Clause 65. The composition of any clauses 52-64, wherein the composition comprises the sterically hindered cyclic amine in an amount of about 20 wt % to about 30 wt %.

Clause 66. The composition of any clauses 52-65, wherein the composition comprises the sterically non-hindered cyclic amine in an amount of up to about 45 wt %.

Clause 67. The composition of any clauses 52-66, wherein the composition comprises the sterically non-hindered cyclic amine in an amount of about 5 wt % to about 35 wt %.

Clause 68. The composition of any clauses 52-67, wherein the composition comprises the sterically non-hindered cyclic amine in an amount of about 5 wt % to about 15 wt %.

Clause 69. The composition of any clauses 52-68, wherein the composition comprises a molar ratio of the sterically hindered cyclic amine relative to the sterically non-hindered cyclic amine of about 5:1.

Clause 70. The composition of any clauses 52-69, wherein the composition further comprises a water miscible solvent comprising at least 4 or more —O— or —OH groups.

Clause 71. The composition clause 70, wherein the composition comprises the water miscible solvent in an amount of up to about 50 wt %.

Clause 72. The composition of any clauses 70-71, wherein the composition comprises the water miscible solvent in an amount of 10 wt % to about 50 wt %.

Clause 72. The composition of any clauses 52-72, wherein the composition comprises a shear viscosity of up to about 20 cP at 40° C.

Clause 74. An aqueous composition for removing acid gas components from a process gas, the composition comprising:
a sterically hindered cyclic amine selected from the group consisting of 2-methylpiperazine, 2,5-dimethylpiperazine, 1,3-dimethylpiperazine, 2,3,5,6-tetramethylpiperazine, 4-hydroxy-2,6-dimethylpiperidine, 4-hydroxy-2,2-dimethylpiperidine, 4-hydroxy-2,2,6,6,-tetramethylpiperidine, and combinations thereof; and
a sterically non-hindered cyclic amine selected from the group consisting of piperazine, 4-hydroxypiperidine, 3-hydroxypiperidine, 4-(hydroxymethyl) piperidine, 3-(hydroxymethyl) piperidine, 3-hydroxypyrrolidine, and combinations thereof, wherein:
the composition comprises a molar ratio of the sterically hindered cyclic amine relative to the sterically non-hindered cyclic amine of about 5:1.

Clause 75. The composition of clause 74, wherein the sterically hindered cyclic amine is 2-methylpiperazine.

Clause 76. The composition of any clauses 74-75, wherein the sterically non-hindered amine is piperazine.

Clause 77. The composition of any clauses 74-76, wherein the composition comprises a total amine content of up to about 55 wt %.

Clause 78. The composition of any clauses 74-77, wherein the composition comprises a total amine content of about 35 wt % to about 45 wt %.

Clause 79. The composition of any clauses 74-78, wherein the composition comprises the sterically hindered cyclic amine in an amount of about 20 wt % to about 30 wt %.

Clause 80. The composition of any clauses 74-79, wherein the composition comprises the sterically non-hindered cyclic amine in an amount of about 5 wt % to about 15 wt %.

Clause 81. The composition of any clauses 74-80, wherein the composition further comprises a water miscible solvent selected from the group consisting of triethylene glycol, tripropylene glycol methyl ether, triglyme, tetraglyme, and combinations thereof.

Clause 82. The composition clause 81, wherein the composition comprises the water miscible solvent in an amount of about 10 wt % to about 50 wt %.

Clause 83. The composition of any clauses 74-82, wherein the composition comprises a shear viscosity of up to about 20 cP at 40° C.

Clause 84. A method of treating a process gas, the method comprising:
providing a process gas and an aqueous absorption medium to an absorption tower;
contacting the process gas with the aqueous absorption medium to produce a loaded aqueous absorption medium, the aqueous absorption medium comprising:
a sterically hindered cyclic amine, and a sterically non-hindered cyclic amine;
providing the loaded aqueous absorption medium to a regeneration tower;
desorbing the loaded aqueous absorption medium to form a regenerated aqueous absorption medium; and
recycling the regenerated aqueous absorption medium to the absorption tower.

Clause 85. The method clause 84, wherein the sterically hindered cyclic amine can be represented by Formula (I):

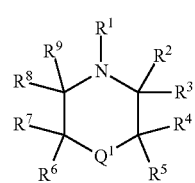

(I)

wherein:
$R^1$ is hydrogen;
each of $R^2$, $R^3$, $R^4$, $R^5$, $R^6$, $R^7$, $R^8$, and $R^9$ is independently selected from hydrogen, methyl, ethyl, n-propyl, iso-propyl, n-butyl, iso-butyl, and sec-butyl; and
$Q^1$ is selected from

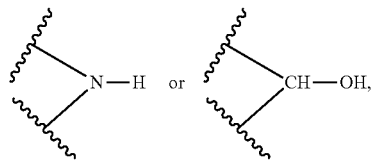

where a wavy line indicates a bonding point to the remainder of the amine of Formula (I).

Clause 86. The method of clause 85, wherein each of $R^2$, $R^3$, $R^4$, $R^5$, $R^6$, $R^7$, $R^8$, and $R^9$ of Formula (I) is independently selected from a hydrogen or a methyl.

Clause 87. The method of any clauses 84-86, wherein the sterically hindered cyclic amine is selected from the group consisting of 2-methylpiperazine, 2,5-dimethylpiperazine, 1,3-dimethylpiperazine, 2,3,5,6-tetramethylpiperazine, 4-hydroxy-2,6-dimethylpiperidine, 4-hydroxy-2,2-dimethylpiperidine, 4-hydroxy-2,2,6,6,-tetramethylpiperidine, and combinations thereof.

Clause 88. The method of any clauses 84-87, wherein the sterically hindered cyclic amine is 2-methylpiperazine.

Clause 89. The method of any clauses 84-88, wherein the sterically non-hindered cyclic amine can be represented by Formula (II):

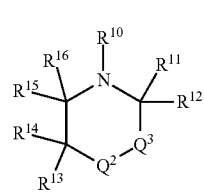

(II)

wherein:
each of $R^{10}$, $R^{11}$, $R^{12}$, $R^{15}$, and $R^{16}$ is hydrogen;
each of $R^{13}$, and $R^{14}$ is independently hydrogen, methyl, ethyl, n-propyl, iso-propyl, n-butyl, iso-butyl, and sec-butyl;
$Q^2$ is selected from

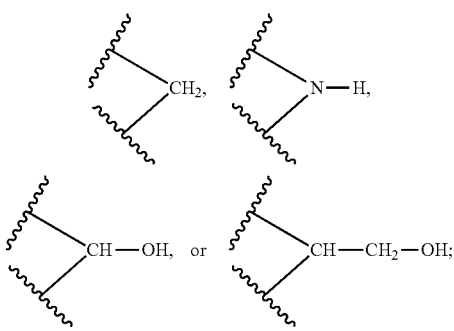

and
Q³ is selected from

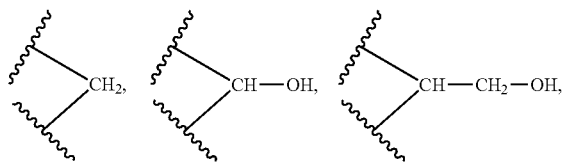

or Q³ is a bond connecting the carbon adjacent to Q³ with Q², wherein if Q² is

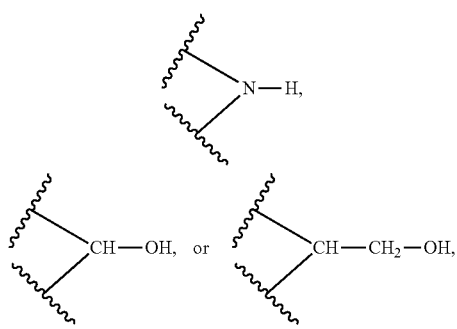

then Q³ is a bond or

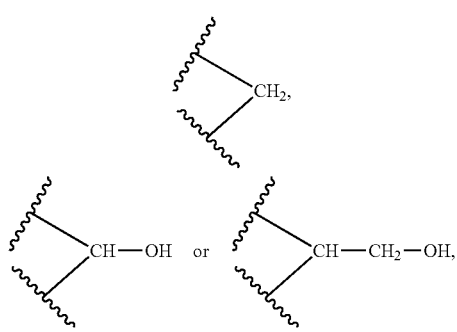

wherein if Q³ is

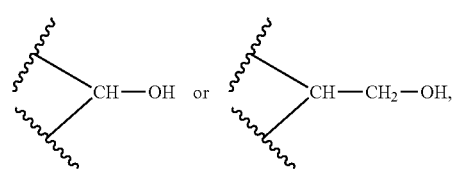

then Q² is

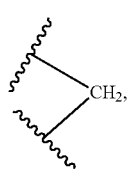 [SMILES: *C*]

wherein if Q² is

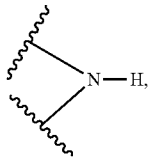

then Q³ is

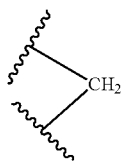

and $R^{13}$ and $R^{14}$ are each hydrogen, wherein a wavy line indicates a bonding point to the remainder of the amine of Formula (II).

Clause 90. The method of any clauses 84-89, wherein the sterically non-hindered amine is selected from the group consisting of piperazine, 4-hydroxypiperidine, 3-hydroxypiperidine, 4-(hydroxymethyl) piperidine, 3-(hydroxymethyl) piperidine, 3-hydroxypyrrolidine, and combinations thereof.

Clause 91. The method of any clauses 84-90, wherein the sterically non-hindered amine is piperazine.

Clause 92. The method of any clauses 84-91, wherein the aqueous absorption medium comprises a total amine content of up to about 55 wt %.

Clause 93. The method of any clauses 84-92, wherein the aqueous absorption medium comprises a total amine content of about 5 wt % to about 50 wt %.

Clause 94. The method of any clauses 84-93, wherein the aqueous absorption medium comprises a total amine content of about 35 wt % to about 45 wt %.

Clause 95. The method of any clauses 84-94, wherein the aqueous absorption medium comprises the sterically hindered cyclic amine in an amount of up to about 45 wt %.

Clause 96. The method of any clauses 84-95, wherein the aqueous absorption medium comprises the sterically hindered cyclic amine in an amount of about 15 wt % to about 45 wt %.

Clause 97. The method of any clauses 84-96, wherein the aqueous absorption medium comprises the sterically hindered cyclic amine in an amount of about 20 wt % to about 30 wt %.

Clause 98. The method of any clauses 84-97, wherein the aqueous absorption medium comprises the sterically non-hindered cyclic amine in an amount of up to about 45 wt %.

Clause 99. The method of any clauses 84-98, wherein the aqueous absorption medium comprises the sterically non-hindered cyclic amine in an amount of about 5 wt % to about 35 wt %.

Clause 100. The method of any clauses 84-99, wherein the aqueous absorption medium comprises the sterically non-hindered cyclic amine in an amount of about 5 wt % to about 15 wt %.

Clause 101. The method of any clauses 84-100, wherein the aqueous absorption medium comprises a molar ratio of the sterically hindered cyclic amine relative to the sterically non-hindered cyclic amine of about 8:1 to about 1:1.

Clause 102. The method of any clauses 84-101, wherein the aqueous absorption medium comprises a molar ratio of the sterically hindered cyclic amine relative to the sterically non-hindered cyclic amine of about 7:1 to about 2:1.

Clause 103. The method of any clauses 84-102, wherein the aqueous absorption medium comprises a molar ratio of the sterically hindered cyclic amine relative to the sterically non-hindered cyclic amine of about 6:1 to about 2:1.

Clause 104. The method of any clauses 84-103, wherein the aqueous absorption medium comprises a molar ratio of the sterically hindered cyclic amine relative to the sterically non-hindered cyclic amine of about 3:1 to about 2:1.

Clause 105. The method of any clauses 84-104, wherein the aqueous absorption medium further comprises a water miscible solvent.

Clause 106. The method of clause 105, wherein the aqueous absorption medium comprises the water miscible solvent in an amount of up to about 50 wt %.

Clause 107. The method of any clauses 105-106, wherein the aqueous absorption medium comprises the water miscible solvent in an amount of 10 wt % to about 50 wt %.

Clause 108. The method of any clauses 84-107, wherein the aqueous absorption medium comprises a shear viscosity of up to about 20 cP at 40° C.

EXAMPLES

Example 1

Rheological measurements were taken from an aqueous absorption media to determine its viscosity as a function of $CO_2$ content and temperature. The results of such measurements are summarized in Table 1.

TABLE 1

Viscosity of an aqueous absorption medium (25 wt % 2-methylpiperazene, 10 wt % piperazene, 65 wt % water) as a function of temperature and $CO_2$ content.

| $CO_2$ Loading | Viscosity at 20° C. (cP) | Viscosity at 40° C. (cP) | Viscosity at 55° C. (cP) | Viscosity at 70° C. (cP) |
| --- | --- | --- | --- | --- |
| 0 | 10.8 | 4.8 | 3 | 2.1 |
| 0.1 | 11.9 | 5.1 | 3.3 | 2.5 |
| 0.3 | 13 | 5.9 | 3.9 | 3 |
| 0.5 | 14 | 6.7 | 4.7 | 4.2 |
| 0.7 | 14.7 | 7.6 | 5.2 | 4.7 |

Increasing the temperature of an aqueous absorption media with a constant $CO_2$ concentration results in a decrease in viscosity. Interestingly, it was found that as the $CO_2$ content present in an aqueous absorption media increases, the resulting viscosity of the aqueous absorption media also increases during an absorption process utilizing a constant process temperature. Without being bound by theory, the viscosity of the aqueous absorption media may be monitored throughout an absorption process, so as to gauge the amount of $CO_2$ present therein at various time intervals throughout such absorption processes. The information collected from such viscosity measurements during an absorption procedure can provide information to an operator pertaining to the temperatures, pressures, and/or residence times of the various process sequences implemented in an absorption process.

Overall, the aqueous absorption media of the present disclosure alleviate/mitigate issues and concerns commonly associated with removal of various acid gas components from a process gas using amine-based solutions. For example, aqueous absorption media of the present disclosure incorporate complementary amounts of both sterically hindered and non-hindered cyclic amines. By limiting the concentration of such cyclic amines within the aqueous absorption medium, concerns of amine precipitation during the regeneration step may be alleviated while also removing greater than about 95% of the absorbed acid gas components therefrom (based on % mol of $CO_2$ absorbed and desorbed). Furthermore, it has been found that glycols and their mono- and dialkyl ethers may be integrated into the aqueous absorption media to assist in the solubilization of the cyclic amine and without solvent emissions commonly associated with other physical solvents used in conventional pressure gas treatment processes.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All numerical values within the detailed description herein are modified by "about" the indicated value, and take into account experimental error and variations that would be expected by a person having ordinary skill in the art.

All documents described herein are incorporated by reference herein, including any priority documents and or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise whenever a composition, an element or a group of elements is preceded with the transitional phrase "comprising," it is understood that we also contemplate the same composition or group of elements with transitional phrases "consisting essentially of," "consisting of," "selected from the group consisting of," or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

The invention claimed is:

1. An aqueous composition for removing acid gas components from a process gas, the composition comprising:
a first cyclic amine having a substituted carbon atom alpha to an amine atom; and
a second cyclic amine having two unsubstituted carbon atoms, wherein each of the unsubstituted carbon atoms is alpha to an amine atom, wherein:
the composition comprises a molar ratio of the first cyclic amine to the second cyclic amine of about 6:1 to about 2:1, and
the first cyclic amine and the second cyclic amine comprise substantially all of the amine content in the aqueous composition.

2. The composition of claim 1, wherein the first cyclic amine can be represented by Formula (I):

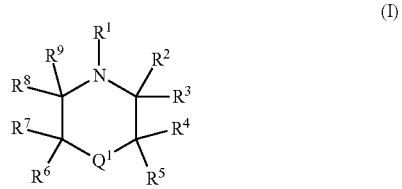

(I)

wherein:
R$^1$ is hydrogen;
each of R$^2$, R$^3$, R$^4$, R$^5$, R$^6$, R$^7$, R$^8$, and R$^9$ is independently selected from the group consisting of a hydrogen, methyl, ethyl, n-propyl, iso-propyl, n-butyl, iso-butyl, and sec-butyl; and
Q$^1$ is selected from

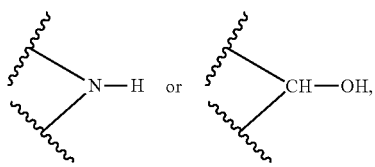

wherein a wavy line indicates a bonding point to the remainder of the amine of Formula (I).

3. The composition of claim 1, wherein the first cyclic amine is selected from the group consisting of 2-methylpiperazine, 2,5-dimethylpiperazine, 1,3-dimethylpiperazine, 2,3,5,6-tetramethylpiperazine, 4-hydroxy-2,6-dimethylpiperidine, 4-hydroxy-2,2-dimethylpiperidine, 4-hydroxy-2,2,6,6,-tetramethylpiperidine, and combinations thereof.

4. The composition of claim 1, wherein the first cyclic amine is 2-methylpiperazine.

5. The composition of claim 1, wherein the second cyclic amine can be represented by Formula (II):

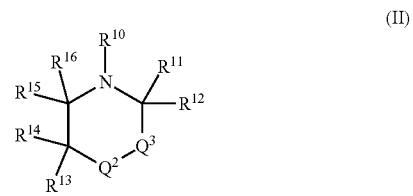

(II)

wherein:
each of R$^{10}$, R$^{11}$, R$^{12}$, R$^{15}$, and R$^{16}$ is hydrogen;
each of R$^{13}$, and R$^{14}$ is independently hydrogen, methyl, ethyl, n-propyl, iso-propyl, n-butyl, iso-butyl, and sec-butyl;
Q$^2$ is selected from

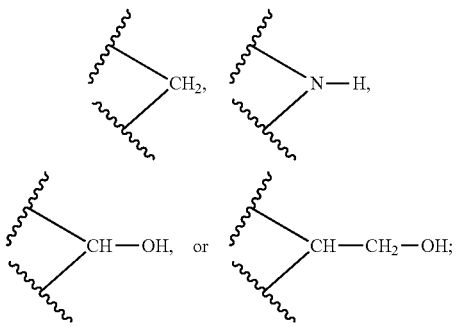

and
Q$^3$ is selected from

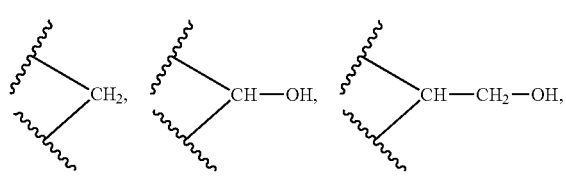

or Q$^3$ is a bond connecting the carbon adjacent to Q$^3$ with Q$^2$, wherein if Q$^2$ is

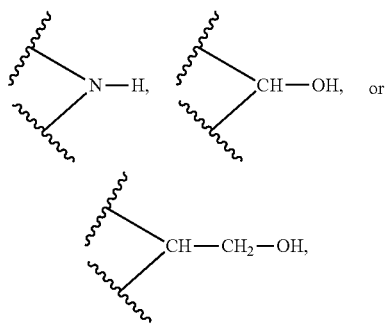

then Q³ is a bond or

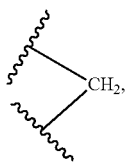 [SMILES: *C*]

wherein if Q³ is

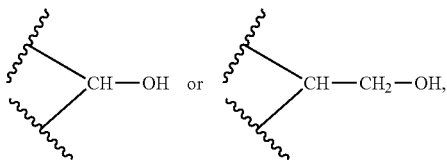

then Q² is

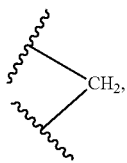 [SMILES: *C*]

wherein if Q² is

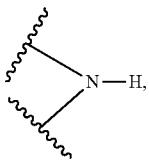

then Q³ is

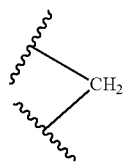 [SMILES: *C*]

and $R^{13}$ and $R^{14}$ are each hydrogen, wherein a wavy line indicates a bonding point to the remainder of the amine of Formula (II).

6. The composition of claim 1, wherein the second cyclic amine is selected from the group consisting of piperazine, 4-hydroxypiperidine, 3-hydroxypiperidine, 4-(hydroxymethyl) piperidine, 3-(hydroxymethyl) piperidine, 3-hydroxypyrrolidine, and combinations thereof.

7. The composition of claim 1, wherein the second cyclic amine is piperazine.

8. The composition of claim 1, wherein the composition comprises a total amine content of about 35 wt % to about 60 wt %.

9. The composition of claim 1, wherein the composition comprises the first cyclic amine in an amount of about 20 wt % to about 45 wt %.

10. The composition of claim 1, wherein the composition comprises the second cyclic amine in an amount of about 5 wt % to about 15 wt %.

11. The composition of claim 1, wherein the molar ratio of the first cyclic amine relative to the second cyclic amine is about 5:1.

12. The composition of claim 1, wherein the composition further comprises a water miscible solvent comprising at least 4 or more —O— or —OH groups.

13. An aqueous composition for removing acid gas components from a process gas, the composition comprising:
a first cyclic amine comprising about 20 wt % to about 45 wt % of the composition, the first cyclic amine having a substituted carbon atom alpha to an amine atom;
a second cyclic amine comprising about 5 wt % to about 15 wt % of the composition, the second cyclic amine having two unsubstituted carbon atoms, wherein each of the unsubstituted carbon atoms is alpha to an amine atom, wherein:
the first cyclic amine and the second cyclic amine comprise substantially all of the amine content in the aqueous composition; and
a water miscible solvent comprising 4 or more —O— or —OH groups.

14. The composition of claim 13, wherein the first cyclic amine is selected from the group consisting of 2-methylpiperazine, 2,5-dimethylpiperazine, 1,3-dimethylpiperazine, 2,3,5,6-tetramethylpiperazine, 4-hydroxy-2,6-dimethylpiperidine, 4-hydroxy-2,2-dimethylpiperidine, 4-hydroxy-2,2,6,6,-tetramethylpiperidine, and combinations thereof.

15. The composition of claim 13, wherein the second amine is selected from the group consisting of piperazine, 4-hydroxypiperidine, 3-hydroxypiperidine, 4-(hydroxymethyl) piperidine, 3-(hydroxymethyl) piperidine, 3-hydroxypyrrolidine, and combinations thereof.

16. The composition of claim 13, wherein the water miscible solvent is selected from the group consisting of triethylene glycol, tripropylene glycol methyl ether, triglyme, tetraglyme, and combinations thereof.

17. A method of treating a process gas, the method comprising:
providing a process gas and an aqueous absorption medium to an absorption tower;
contacting the process gas with the aqueous absorption medium to produce a loaded aqueous absorption medium, the aqueous absorption medium comprising:
about 20 wt % to about 45 wt % of a first cyclic amine having a substituted carbon atom alpha to an amine atom, and
about 5 wt % to about 15 wt % of a second cyclic amine having two unsubstituted carbon atoms, wherein each of the unsubstituted carbon atoms is alpha to an amine atom, wherein:
the first cyclic amine and the second cyclic amine comprise substantially all of the amine content in the aqueous composition;
providing the loaded aqueous absorption medium to a regeneration tower;
desorbing the loaded aqueous absorption medium to form a regenerated aqueous absorption medium; and
recycling the regenerated aqueous absorption medium to the absorption tower.

18. The method of claim 17, wherein the aqueous absorption medium comprises a molar ratio of the first cyclic amine relative to the second cyclic amine of about 6:1 to about 2:1.

19. The method of claim 17, wherein the aqueous absorption medium comprises a molar ratio of the first cyclic amine relative to the second cyclic amine of about 3:1 to about 2:1.

20. The method of claim 17, wherein the aqueous absorption medium further comprises a water miscible solvent in an amount of about 10 wt % to about 50 wt %.

* * * * *